United States Patent [19]

Rozanski et al.

[11] Patent Number: 5,493,563
[45] Date of Patent: Feb. 20, 1996

[54] METHOD AND APPARATUS FOR MOBILE ASSISTED HANDOFF IN A COMMUNICATION SYSTEM

[75] Inventors: Walt Rozanski, Hurst, Tex.; Kamyar Rohani, Vista, Calif.

[73] Assignee: Motorola, Inc., Schaumburg, Ill.

[21] Appl. No.: 97,499

[22] Filed: Jul. 26, 1993

[51] Int. Cl.⁶ ........................................ H04J 3/16
[52] U.S. Cl. .......................... 370/50; 370/95.1; 370/95.3; 370/111; 455/33.2; 379/60
[58] Field of Search ............................. 455/33.1, 33.2, 455/33.4, 34.1, 34.2, 56.1, 54.1, 115; 370/95.1, 95.3, 79, 80, 69.1, 74, 76, 110.1, 110.4, 111, 50, 81; 379/60, 59, 63

[56] References Cited

U.S. PATENT DOCUMENTS

| | | |
|---|---|---|
| 4,608,711 | 8/1986 | Goldman ............................. 455/33.2 |
| 4,799,252 | 1/1989 | Eizenhöffer et al. ..................... 370/50 |
| 5,042,082 | 8/1991 | Dahlin ..................................... 455/33.2 |
| 5,134,615 | 7/1992 | Freeburg et al. ....................... 370/95.3 |
| 5,157,661 | 10/1992 | Kanai et al. ............................. 370/95.1 |
| 5,224,121 | 6/1993 | Schoman ................................ 455/33.1 |
| 5,299,198 | 3/1994 | Kay et al. .............................. 455/33.1 |

Primary Examiner—Melvin Marcelo
Assistant Examiner—Huy D. Vu
Attorney, Agent, or Firm—Richard A. Sonnentag; Daniel C. Crilly

[57] ABSTRACT

A communication system utilizes rotated bursts of voice channels to implement mobile assisted handoff (MAHO). Mobile stations measure the voice channels of adjacent cells as hopping frequencies are rotated from frame-to-frame of the communication system. Measurement of the voice channels of adjacent cells can be performed by mobile stations during timeslots subsequent to their receive and transmission so that measurement during a timeslot dedicated to a control channel related to the adjacent cells is not necessary.

14 Claims, 5 Drawing Sheets

METHOD AND APPARATUS FOR MOBILE ASSISTED HANDOFF IN A COMMUNICATION SYSTEM

FIELD OF THE INVENTION

The invention relates generally to communication systems and more particularly to mobile assisted handoff in digital cellular communications systems.

BACKGROUND OF THE INVENTION

Current communication systems, for example digital cellular communications systems, utilize certain capabilities in mobile stations to aid in communication handoff of the mobile station from one communication channel to another. This technique is called mobile assisted handoff, or MAHO. During MAHO, a mobile station is instructed by its serving base-station (or the mobile station knows in advance) to measure transmissions made by adjacent base-stations to determine the quality of those transmissions relative to the transmission of the serving base-station. The mobile station then reports the measured quality of those transmissions to the serving base-station where a handoff evaluation is performed. If any adjacent base-station provides a better quality transmission than does the serving base-station, a communication handoff of the subscriber unit is initiated. While the above describes MAHO implemented in a cell-to-cell handoff from the serving base-station to an adjacent base-station, MAHO can be equally implemented in a sector-to-sector handoff within a given cell.

In current digital cellular communications systems, MAHO is implemented by monitoring a control channel assigned to each sector/cell of the system, where each control channel is at a particular frequency. However, since each sector/cell of the system has its own control channel at a particular frequency, a large number of talk channels, or voice channels, are wasted since potential frequencies that could be used for voice channels are utilized as control channels specifically for the implementation of MAHO.

Implementation of MAHO by monitoring control channels has other disadvantages. Typically, a mobile station making a MAHO measurement makes a power measurement (RSSI) on a control channel. However, these sequences are short for control channels, thus a mobile station is required to make several measurements (for example, over several timeslots of a time division multiple access (TDMA) digital cellular communications system) to obtain accurate measurements. Consequently, a mobile station may, in some instances, lose communication with its serving base-station before an accurate MAHO measurement can be obtained.

Thus a need exists for a communication system which provides MAHO capability without wasting potential traffic channels and losing communication during handoff.

DETAILED DESCRIPTION OF A PREFERRED EMBODIMENT

A communication system implements MAHO by measuring an adjacent base-station's transmission of talk channels, or voice channels, in accordance with the invention. In the preferred embodiment, the communication system utilizes both a code division multiple access (CDMA) protocol and a time division multiple access (TDMA) protocol. By measuring voice channels for either a cell-to-cell handoff or a sector-to-sector handoff, the requirement for control channels in every sector/cell specifically for purposes of MAHO is eliminated. Likewise, since voice channels typically have long pilot sequences or training sequences, a shorter time is required to make the measurement, thus mitigating the loss of communication during handoff. The CDMA/TDMA cellular communication system takes advantage of the fact that each voice channel has a known pilot sequence, or synchronization sequence, that differs from sector-to-sector and/or cell-to-cell so that a mobile station can use this to identify a particular sector/cell. The preferred embodiment assumes that cells are both time synchronized and are of a small size such that propagation delay is small in comparison to slot times. In this manner, the voice channel can be utilized in a manner similar to that of the control channel, without incurring the disadvantages that measurement of the control channel produces.

Figure 1:
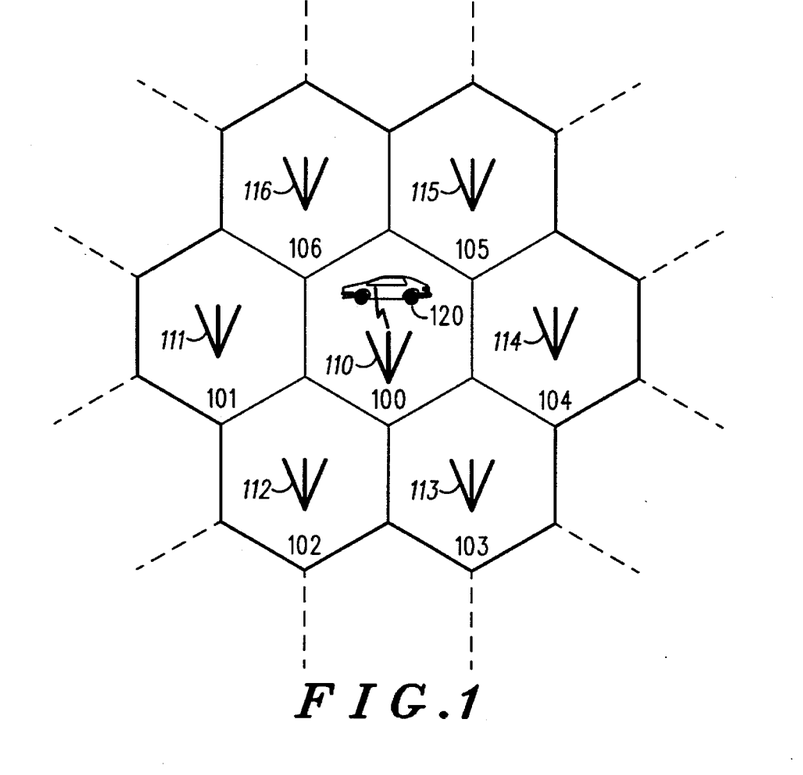
FIG. 1 generally depicts a topological view of a cellular communication system which may beneficially employ the present invention.

FIG. 1 generally depicts a topological view of a TDMA cellular communication system which may beneficially employ the present invention. As shown in FIG. 1, a serving base-station 110 in a cell 100 communicates with a mobile station 120 via a radio frequency (RF) channel. As depicted in FIG. 1, mobile station 120 is shown as an automobile, but may be a portable station utilized by a pedestrian, or any other similar station. Since typical communication consists of a users speech, the communication link between serving base-station 110 and mobile station 120 is called a voice channel. Surrounding serving base-station 110 within cell 100 are adjacent cells 101–106 within cells 111–116 respectively. In the preferred embodiment, mobile station 120 is capable of implementing mobile assisted handoff, or MAHO, to aid in the process of communication handoff when required.

Figure 2:
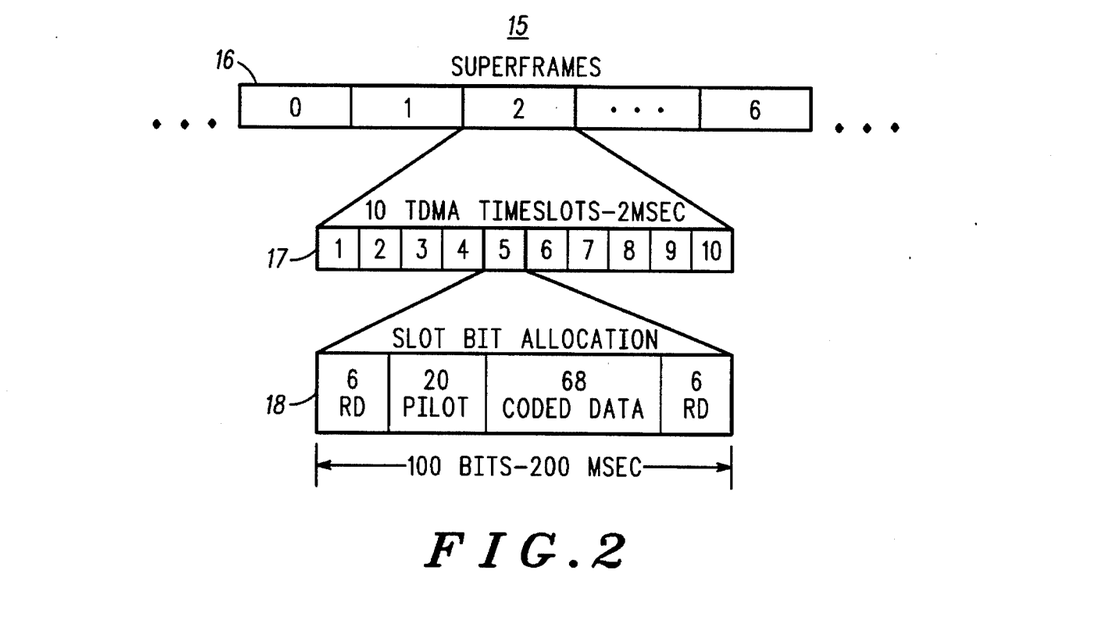
FIG. 2 generally depicts a frame structure utilized by the cellular communication system of FIG. 1.

FIG. 2 generally depicts a frame structure utilized by the cellular communication system of FIG. 1. As depicted in FIG. 2, each frame, generally designated 15, is interleaved with one another to produce superframes 16. In the cellular communication system of the preferred embodiment, frequency hopping occurs from frame-to-frame of superframes 16. In other words, for a particular transmission from a particular base-station, the frequency between successive frames will change. Continuing, each frame is a TDMA (Time Division Multiple Access) frame 17 comprised of 10 timeslots. Each timeslot of TDMA frame 17 consists of 100 bits which consists of 6 ramp up bits, 20 pilot bits, 68 coded data bits (speech bits), and 6 ramp down bits. The 68 speech bits consist of interleaved speech, FED, and signaling bits. Each slot is 200 μsec (microseconds) long. This results in TDMA frame 17 being 2 msec (millisecond). Since this protocol utilizes both slow frequency hopping code-division multiple access (SFH CDMA) (i.e., the hopping sequence) combined with a time-division multiple access method (TDMA) (multiple timeslot configuration) this protocol could best be characterized as a combination CDMA/TDMA method.

Figure 3:
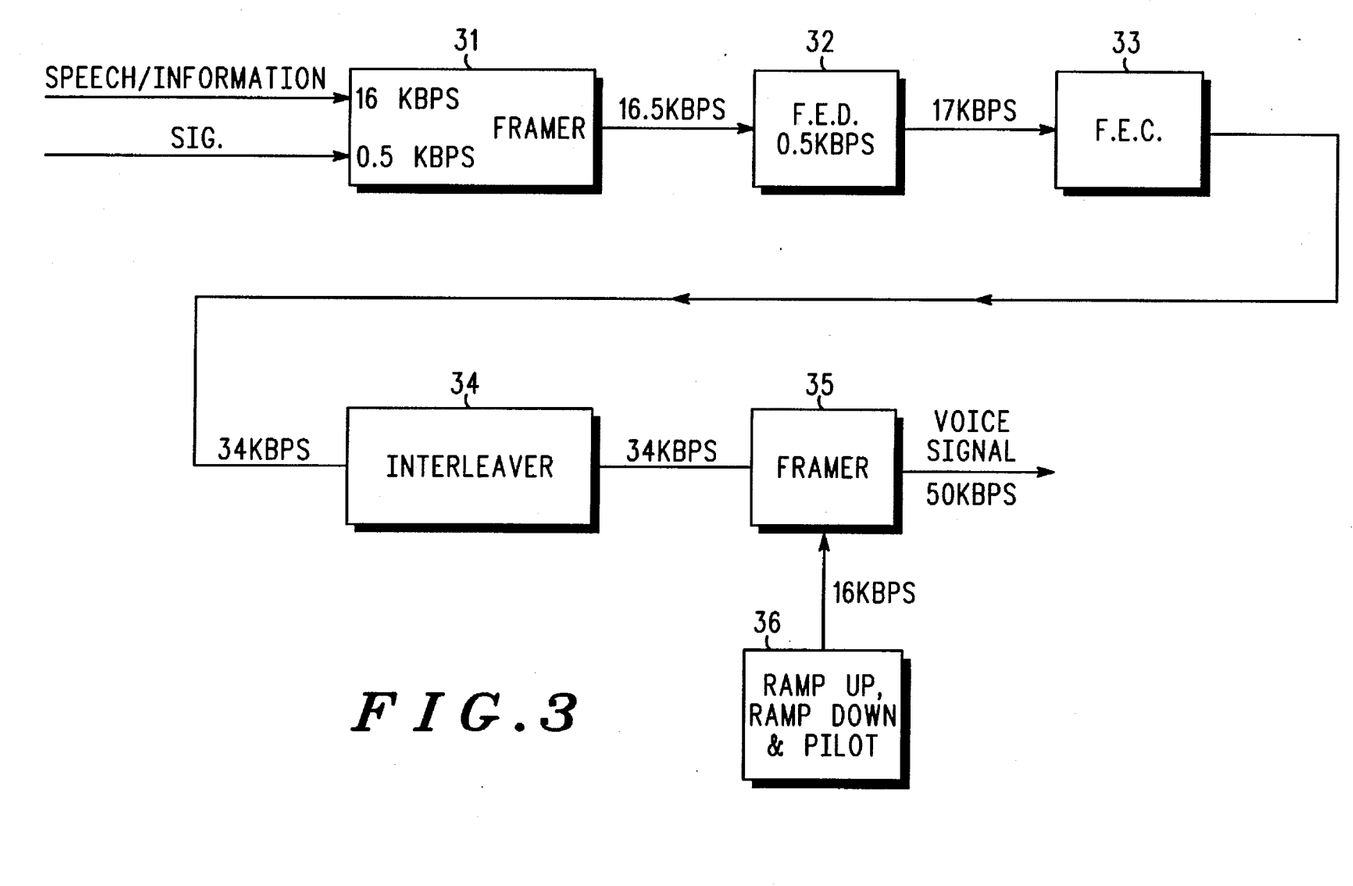
FIG. 3 generally depicts in block diagram form a portion of a base-station or a mobile station utilized to implement the present invention.

A block diagram of the operation of the CDMA/TDMA cellular communication system of FIG. 1, generally designated 30, is illustrated in FIG. 3. A speech/information signal is received at one input of a framing device 31 and a signaling signal is received at a second input. In the preferred embodiment the speech is received at 16 kbps and the signaling at 0.5 kbps. The output from framing device 31 is a 16.5 kbps signal. This frame is input to a forward error detection (FED) device 32 which adds an additional 0.5 kbps signal onto the 16.5 kbps signal from framer 31. The output from FED 32 is input to a forward error correction (FEC) device 33. This takes the 17 kbps input and codes it to provide a 34 kbps output signal. The 34 kbps signal is then interleaved in interleaver 34. The ramp up, pilot, and ramp down bits (16 kbps), block 36, are then added, in framer block 35, to the signal frame which provides the 50 kbps traffic channel output. This compares with the 100 bit slots provided in FIG. 2 since the flames in FIG. 2 are 2 ms each or 500 frames per second. With each frame being 100 bits, the rate calculates out to the same 50 kbps figure. Likewise, the 32 bits per frame provided for ramping and pilot bits would be 16 kbps for 500 frames per second.

Figure 4:
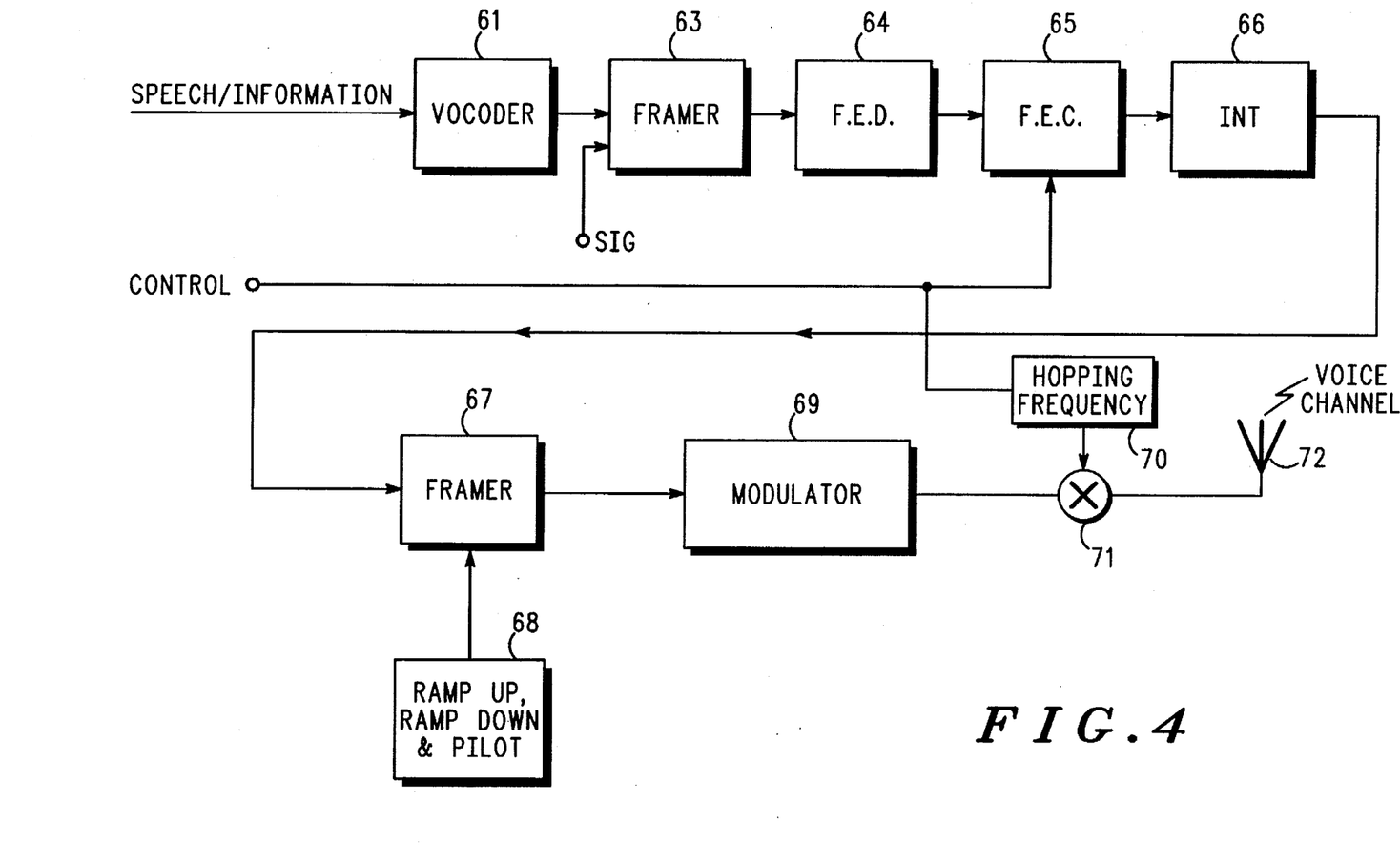
FIG. 4 generally depicts in block diagram form the transmit side of a base-station or a mobile station utilized to implement the present invention.

FIG. 4 generally depicts in block diagram form the transmit side of a base-station or a mobile station utilized to implement the present invention. A received speech/information signal enters and is presented to a vocoder 61, which in the preferred embodiment is a 16 kbps LD-CELP vocoder. The coded signals are then framed in framer 63 and have the forward error detection bits added in FED 64. The framed signal has bits added for forward error correction in FEC 65 and is interleaved in interleaver 66. Following interleaver 66, the ramp up, ramp down, and pilot bits are added to the signal in framer 67. The signal is then modulated in modulator 69. The type of modulation scheme used will be a form of QPSK (Quadrature Phase Shift Keyed) modulation (such as π/4 DQPSK, Offset QPSK, etc.) and, in this preferred embodiment, is a filtered QPSK, or 4QAM (Quadrature Amplitude Modulation), modulation. The modulated signal exiting modulator 69 is then mixed, in mixer 71, with the hopping frequency from block 70. The signals are then output through an antenna 72.

Figure 5:
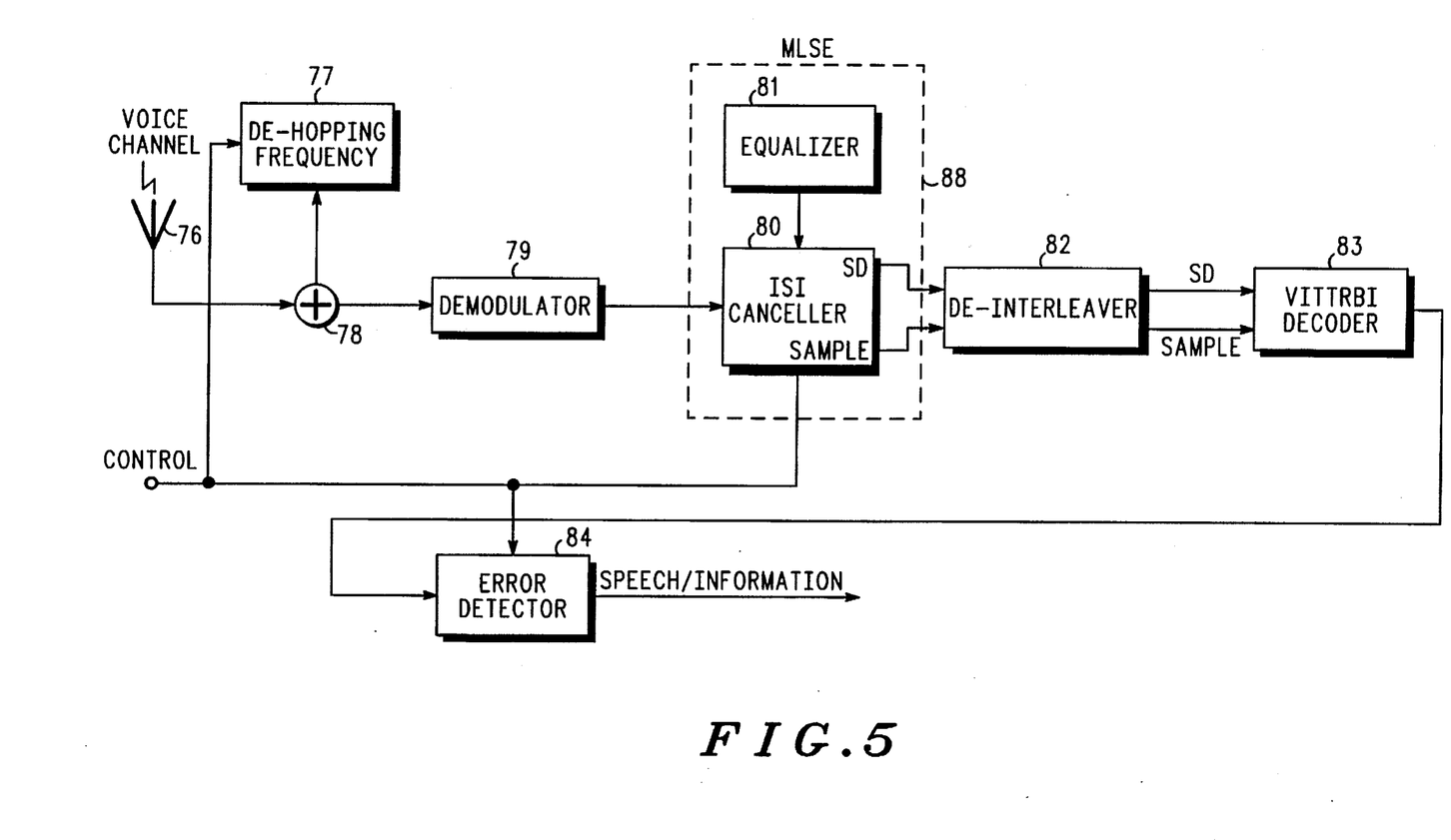
FIG. 5 generally depicts in block diagram form the receive side of a base-station or a mobile station utilized to implement the present invention.

FIG. 5 generally depicts in block diagram form the receive side of a base-station or a mobile station utilized to implement the present invention. In operation, a voice signal is received at antenna 76 and is mixed, in mixer 78, with a de-hopping frequency, block 77. The signal is then demodulated in block 79.

In a slow fading environment, multiple rays of a given signal will be received at different times/phases resulting from reflections of the signal from various objects (e.g. buildings, mountains). Therefore, the signal is provided to a Maximum Likelihood Sequence Estimator (MLSE) equalizer 88 which consists of an equalizer 81 and an InterSymbol Interference (ISI) canceller 82. Equalizer 81 looks at the sum of the whole received signal and determines where the main signal lies. The output of equalizer 81 is a set of "hard decisions", or logical 0's and 1's, which are input to canceller 80. ISI 80 takes the "hard decision" output from equalizer 81 and uses the output to eliminate the intersymbol interference from the input signal. The resulting sample signal and a set of "soft decisions" from canceller 80 are de-interleaved in de-interleaver 82 and then provided to a Viterbi decoder 83 for decoding. Following decoder 83, errors in the signal are detected by error detector 84 and the signal is then output for further processing. If the system is operated in areas of sufficiently low delay spread MLSE 88 could be eliminated, and demodulator 79 would connect directly to de-interleaver 82.

In the cellular communication system of the preferred embodiment, the voice channel transmitted by antenna 72 of FIG. 4 and received by antenna 76 of FIG. 5 represents the transmission of superframes 16 on a particular RF carrier. As previously stated, each base-station 110–116 of respective cells 100–106 frequency hops, via a hopping sequence, from frame-to-frame as shown in FIG. 2. To aid in the handoff of a mobile station 120 from a source base-station to an adjacent base-station, MAHO is accomplished by measuring voice channels of adjacent cells in accordance with the invention. In the preferred embodiment, the measurement of voice channels of adjacent cells is a measurement during a timeslot of a frame of a voice channel of an adjacent cell. Also in the preferred embodiment, the measurement is a power level measurement or a carrier-to-interference (C/I) measurement. Continuing, the timeslots of voice channels have known pilot sequences which differ from cell-to-cell which can be utilized to identify/distinguish cells 100–106 from one another. Each mobile station, after receiving and transmitting a voice "burst" during respective timeslots of a frame, moves to a frequency (of a hopping sequence of an adjacent cell) and measures a quality factor, which in the preferred embodiment is a power level, in the known pilot sequence. For the 10 timeslot frame structure of the preferred embodiment, each mobile station has the capability of measuring two adjacent cells (per frame) if a two-timeslot switch-time synthesizer is assumed. As switch times of synthesizers decrease, mobile stations will acquire the capability of measuring more than two adjacent cells (per frame).

One problem with measuring the timeslot of the voice channels is that the power levels within the timeslots are altered by the presence of voice activity detection and power control. In other words, a mobile station measuring a timeslot of an adjacent cells voice channel may not make a measurement representative of the actual power level. To alleviate this problem, a rotated burst voice channel is utilized in accordance with the invention, as generally depicted in TABLE 1 below. A timeslot of a given frequency hopping carrier is at a nominal power level at a given instant of time. The frequency hopping carrier rotates through all timeslot positions allowing different mobile stations to lock and make MAHO measurements. For example, in frame number 0 for cell 100, timeslot 1 is the dedicated MAHO timeslot. In the next frame (frame 1) for cell 100, timeslot 2 is the dedicated MAHO timeslot. In other words, for each cell, only one timeslot out of 10 is a dedicated MAHO timeslot, and the MAHO timeslot is rotated from frame-to-frame. Important to note is that timeslots having no activity require transmission of a dummy data packet at a nominal power level.

TABLE 1

| CELL NUMBER | FRAME NUMBER | | | | | | | | | |
|---|---|---|---|---|---|---|---|---|---|---|
| | 0 | 1 | 2 | 3 | 4 | 5 | 6 | 7 | 8 | 9 |
| 100 | 1 | 2 | 3 | 4 | 5 | 6 | 7 | 8 | 9 | 10 |
| 101 | 10 | 1 | 2 | 3 | 4 | 5 | 6 | 7 | 8 | 9 |
| 102 | 9 | 10 | 1 | 2 | 3 | 4 | 5 | 6 | 7 | 8 |
| 103 | 8 | 9 | 10 | 1 | 2 | 3 | 4 | 5 | 6 | 7 |
| 104 | 7 | 8 | 9 | 10 | 1 | 2 | 3 | 4 | 5 | 6 |
| 105 | 6 | 7 | 8 | 9 | 10 | 1 | 2 | 3 | 4 | 5 |
| 106 | 5 | 6 | 7 | 8 | 9 | 10 | 1 | 2 | 3 | 4 |

The header shows "0 1 2 3 4 5 6 7 8 9 ." suggesting there may be an extra column.

Figure 6:
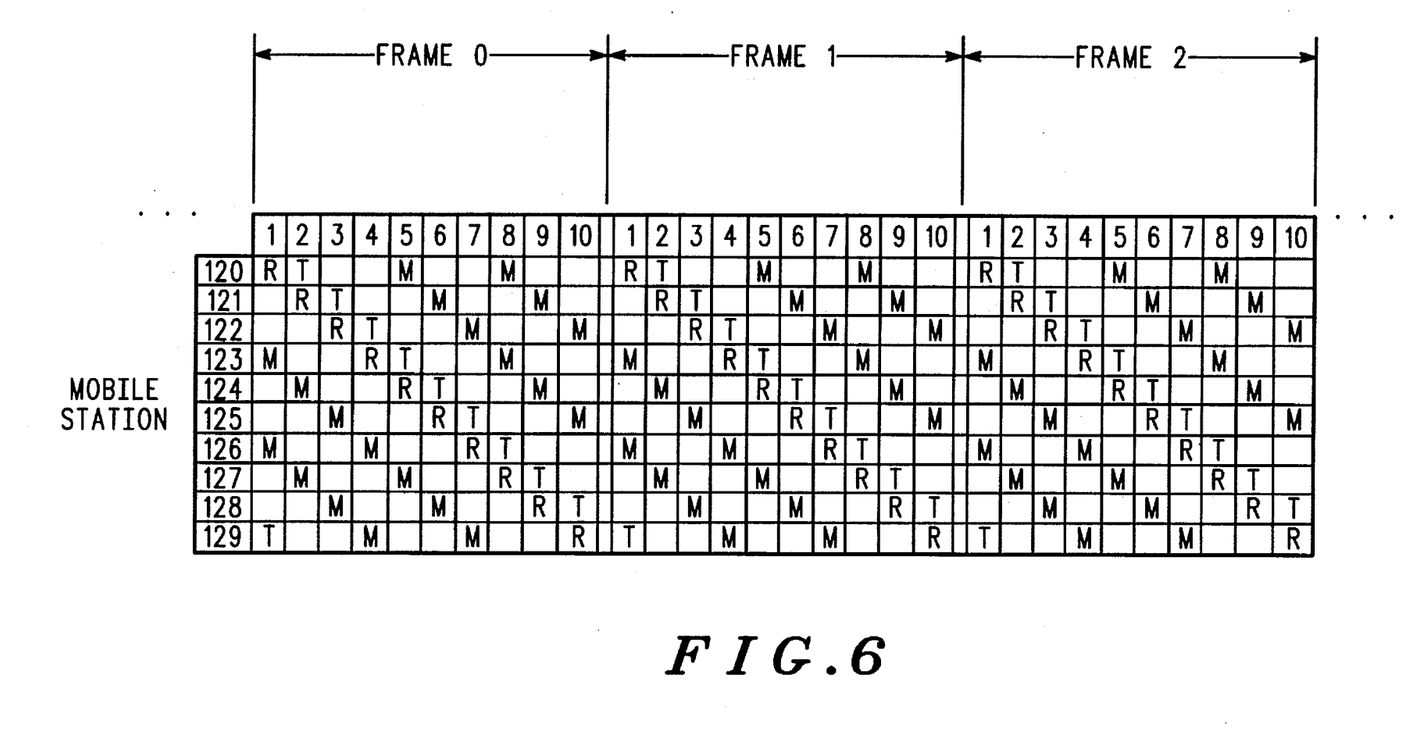
FIG. 6 generally depicts mobile stations measuring the rotated burst voice channels in accordance with the invention.

FIG. 6 generally depicts mobile stations measuring the rotated burst voice channels in accordance with the invention. As shown in FIG. 6, timeslots for each mobile station include a timeslot in which a mobile station receives a transmission (designated by "r"), a timeslot in which a mobile station transmits a transmission (designated by "t") and a timeslot in which a mobile station makes a MAHO measurement (designated by "m"). Since no control channel is required to make MAHO measurements, the duty cycle on this channel need only be one slot of a frame to satisfy MAHO requirements.

Utilizing the rotated burst measurement of voice channels in accordance with the invention, mobile station 120 chooses a frequency based on a timeslot in which information is to be transmitted. In the preferred embodiment, mobile station 120 can choose the frequency by either storing information correlating frequencies with timeslots, receiving download information correlating frequencies with timeslots, or calculating a correlation between frequencies with timeslots in real time. For example, from FIG. 6, mobile station 120 can make MAHO measurements during timeslot 5 and 8. To make MAHO measurements of cell 100, mobile station would choose the hopping frequency that would correspond to frame number 4 (or 7) since mobile station 120 can only make MAHO measurements during timeslots 5 and 8 (see TABLE 1). To make MAHO measurements of cell 101, mobile station 120 would choose the hopping frequency that corresponds to frame 5 of cell 101 and make a MAHO measurement. To measure cell 102, mobile station 120 would choose the hopping frequency that corresponds to frame 6 of cell 102 and make a MAHO measurement. This is then repeated until all adjacent cells are measured. From the above example, the type of information correlating frequencies to timeslots (timeslot 5) would be: hopping frequency for cell 100, frame 4; hopping frequency for cell 101, frame 5; hopping frequency for cell 102, frame 6; etc. Clearly, all mobile stations 120 and 121–129 (not shown) may beneficially utilize MAHO measurement of rotated burst voice channels in accordance with the invention. Also, the above measurement sequence by mobile station 120 (and other mobile stations) may be repeated over a series of frames to obtain average power level measurements for each adjacent cell.

As previously stated, mobile station 120 will measure a voice information signal (i.e., a traffic data signal) when present and a substitute MAHO signal in the absence of the traffic signal. The substitute MAHO signal may comprise a dummy burst of information that mobile station 120 can measure to produce a quality factor (power level) for purposes of MAHO.

An additional advantage of the method in accordance with the invention, over the method of simply measuring the control channel, is that the MAHO measurement of a given base-station can be made at several frequencies. In general, MAHO measurements require averaging to average out Rayleigh fading in the channel. This can take quite a long time if the mobile station is moving slowly, or is stationary. By making measurements at several frequencies, the interval of time for averaging can be shortened, allowing faster MAHO operation.

While the invention has been particularly shown and described with reference to a particular embodiment, it will be understood by those skilled in the art that various changes in form and details may be made therein without departing from the spirit and scope of the invention.

What we claim is:

1. A method of performing mobile assisted handoff, MAHO, in a cellular communication system, the method comprising the steps of:

transmitting from a base-station a traffic data signal, when present, and a substitute MAHO data signal, in the absence of the traffic data signal;

receiving, at a mobile station, said traffic data signal, when present, and said substitute MAHO data signal, in the absence of the traffic data signal; and measuring during a MAHO time period, at the mobile station, a quality factor utilized for purposes of MAHO and related to said traffic data signal, when present, and said substitute MAHO data signal, in the absence of the traffic data signal.

2. The method of claim 1 wherein said step of transmitting further comprises the step of transmitting said traffic data signal, when present, and said substitute MAHO data signal, in the absence of the traffic data signal, at a nominal power level.

3. A method of mobile assisted handoff, MAHO, in a timeslotted communication system, the method comprising the steps of:

choosing, at a base-station, a frequency based on a timeslot in which an information signal is to be transmitted;

transmitting, from said base-station, a voice information signal when present and a substitute MAHO information signal, in the absence of the voice information signal, to a mobile station on said frequency chosen during said timeslot;

receiving at the mobile station, said voice information signal, when present, and said substitute MAHO information signal, in the absence of said voice information signal; and measuring during a MAHO time period, at the mobile station, a quality factor related to said transmission of said voice information signal when present and said substitute MAHO information signal, in the absence of the voice information signal, on said frequency chosen during said timeslot for MAHO purposes.

4. The method of claim 3 wherein said step of measuring a quality factor further comprises the step of measuring one of a power level and a carrier-to-interferences, level of said transmission of said voice information signal when present and said substitute MAHO information signal, in the absence of the voice information signal.

5. The method of claim 3 wherein said step of measuring a quality factor on said frequency chosen during said timeslot is based on information regarding said frequency chosen and said timeslot transmitted by said base-station to said mobile station.

6. The method of claim 5 wherein said information regarding said frequency chosen and said timeslot transmitted by said base-station to said mobile station further comprises a pseudo-random sequence regarding said frequency chosen and said timeslot.

7. The method of claim 3 wherein said step of transmitting further comprises the step of transmitting one of a voice information signal when present and a substitute MAHO information signal, in the absence of the voice information signal, at a nominal power level.

8. A cellular communication system which implements mobile assisted handoff, MAHO, the cellular communication system comprising:

means, at a base-station, for transmitting a traffic data signal, when present, and a substitute MAHO data signal in the absence of the traffic data signal;

means, at a mobile station, for receiving said traffic data signal, when present, and said substitute MAHO data signal, in the absence of the traffic data signal; and means, at the mobile station, for measuring, during a MAHO time period, a quality factor utilized for purposes of MAHO and related to said traffic data signal, when present, and said substitute MAHO data signal, in the absence of the traffic data signal.

9. The cellular communication system of claim 8 wherein said means for transmitting further comprises means for transmitting a traffic data signal, when present, and a substitute MAHO data signal, in the absence of the traffic data signal, at a nominal power level.

10. A timeslotted communication system which implements mobile assisted handoff, MAHO, the timeslotted communication system comprising:

means, at a base-station, for choosing a frequency based on a timeslot in which an information signal is to be transmitted;

means, at said base-station, for transmitting a voice information signal when present and a substitute MAHO information signal, in the absence of the voice information signal, to a mobile station on said frequency chosen during said timeslot;

receiving, at said mobile station, said voice information signal, when present, and said substitute MAHO information signal, in the absence of said voice information signal; and means, at said mobile station, for measuring, during a MAHO time period, a quality factor related to said voice information signal when present and said substitute MAHO information signal, in the absence of the voice information signal, on said frequency chosen during said timeslot for MAHO purposes.

11. The timeslotted communication system of claim 10 wherein said means for measuring a quality factor further comprises means for measuring a power level of said transmission of said voice information signal when present and said substitute MAHO information signal, in the absence of the voice information signal.

12. The timeslotted communication system of claim 10 wherein means for measuring a quality factor on said frequency chosen during said timeslot is based on information regarding said frequency and said timeslot transmitted by said base-station to said mobile station.

13. The timeslotted communication system of claim 12 wherein said information regarding said frequency chosen and said timeslot transmitted by said base-station further comprises a pseudo-random sequence regarding said frequency chosen and said timeslot.

14. The timeslotted communication system of claim 10 wherein said means for transmitting further comprises means for transmitting one of a voice information signal when present and a substitute MAHO information signal; in the absence of said voice information signal, at a nominal power level.

\* \* \* \* \*

UNITED STATES PATENT AND TRADEMARK OFFICE
CERTIFICATE OF CORRECTION

PATENT NO. : 5,493,563

DATED : Feb. 20, 1996

INVENTOR(S) : Rozanski, et al.

It is certified that error appears in the above-indentified patent and that said Letters Patent is hereby corrected as shown below:

Column 6, line 45 reads "receiving at" should be --receiving, at--.
Column 6, line 57 reads "carrier-to-interferences, should be --carrier-to-interference--.
Column 8, line 23 reads "frequency and" should be --frequency chosen and--.
Column 8, line 33 reads "signal;" and should be --signal,--.

Signed and Sealed this

Eighteenth Day of June, 1996

Attest:

BRUCE LEHMAN

*Attesting Officer*     *Commissioner of Patents and Trademarks*